R. S. FOWLER

Oct. 20, 1931. FASTENING MEANS FOR BELTS Re. 18,232

Original Filed Dec. 26, 1928

Inventor
R. S. FOWLER
By Victor J. Evans
Attorney.

Reissued Oct. 20, 1931

Re. 18,232

UNITED STATES PATENT OFFICE

RALPH S. FOWLER, OF SAN FRANCISCO, CALIFORNIA

FASTENING MEANS FOR BELTS

Original No. 1,785,947, dated December 23, 1930, Serial No. 328,483, filed December 26, 1928. Application for reissue filed December 29, 1930. Serial No. 505,433.

This invention relates to improvements in belts and has particular reference to a fastening means whereby the belt may be readily fastened and unfastened without injuring the belt.

A further object of this invention is to produce a device which is economical to manufacture.

A still further object is to produce a device which is neat in appearance and one which will not detract from the appearance of the belt.

Other objects and advantages will be apparent during the course of the following description.

In the accompanying drawings forming a part of this specification, and in which like numerals are employed to designate like parts throughout the same, Fig. 1 is a perspective view of a belt having my invention applied thereto.

At the present time it is common to employ a buckle having one or more prongs, which prongs are projected through openings in the belt and it is, therefore, necessary to bend the belt upon itself in order to thread it through the buckle. This bending each time the belt is buckled and unbuckled causes the grain of the leather to bend with the result that an unsightly appearance occurs.

Figure 1:
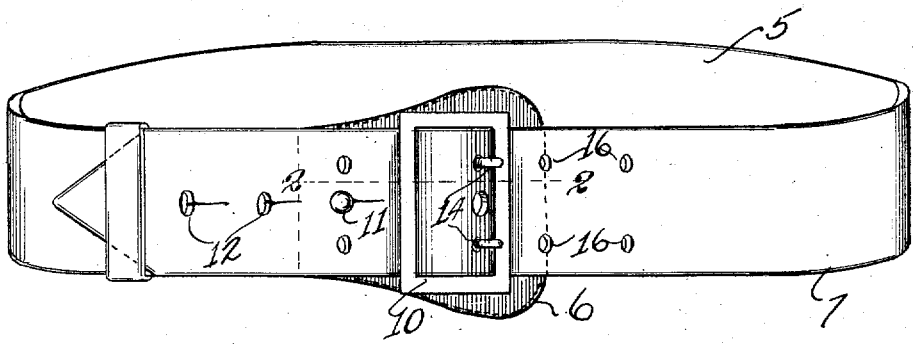
Figure 2:
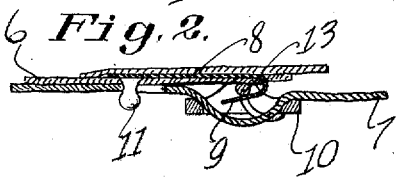
Fig. 2 is a fragmentary cross-sectional view taken on the line 2—2 of Fig. 1.

Referring to Fig. 1, the numeral 5 designates the belt as a whole having ends 6 and 7. To the end of 6 I secure my invention, which consists of a plate 8 secured thereto in parallel relation and having a bent end 9. This bent end projects through a slot formed in the belt (see Fig. 2). Riveted to the plate 8 is a stud 11, which stud is adapted to project through openings 12 formed in the end 7 of the belt. At 10 I have shown a buckle having a usual cross piece 13 and prongs 14. These prongs are adapted to project through openings 16 punched in the end 7 of the belt.

Figure 5:
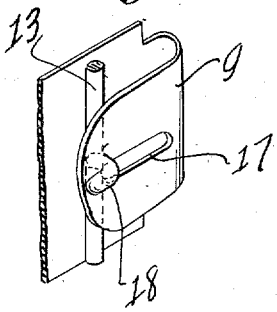
Fig. 5 is a fragmentary perspective view of the modified form of hook.

In the modified form shown in Fig. 5, the construction is exactly the same with the exception that the end 9 has a slot 17 formed therein so that a hook 18 carried upon the bar 13 may be passed through the slot to further retain the same in position. This arrangement would prevent the accidental unhooking of the belt as might possibly occur under unusual circumstances.

The same result of holding the hook and bar in engagement is accomplished in my preferred embodiment as follows: The stud 11 is fastened to the belt the required distance from the hook 9. The perforations in the outer lap of the belt are then so spaced that when the bar 13 is in engagement with the hook 9, a perforation 12 is directly in line with stud 11 so that the latter can pass through it. The distance between the stud 11 and hook 9 is substantially equal to the distance between a perforation 12 and bar 13 and the stud thus functions to hold the hook and bar in engagement.

Figure 3:
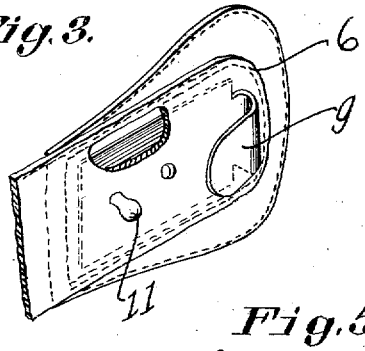
Fig. 3 is a perspective view of the hook portion of the belt.
Figure 4:
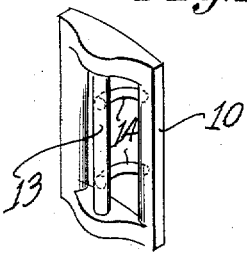
Fig. 4 is a perspective view of the buckle.

The manner of employing my device is as follows:

The buckle 10 is placed upon the end 7, the plate 8 is secured to the end 6 in the manner shown in Fig. 3. By now hooking the bar 13 of the buckle 10 into the hook 9 of the plate 8 the two ends of the belt will be held in the adjusted position and then the stud 11 may be forced through one of the openings 12 and the buckling operation has been completed. Thus the normal way to separate the belt from the buckle is first to lift the perforated end from the stud and then to leave the buckle in its normal position on the perforated end of the belt and simply disengage the buckle from its hook or other complementary connecting part carried by the inner lap of the belt.

From the foregoing description and the accompanying drawings, it will be apparent that I have devised a simple and economical belt attachment that will satisfactorily perform the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, what I claim and desire to secure by Letters Patent is:

1. In a device of the character described, a belt having a buckle secured to one end thereof, and having a bar upon its rear side, a plate secured to the opposite end of said belt, said plate being in a plane parallel to the end of the belt to which it is attached, said plate having a curved hook formed integral therewith and adapted to engage said bar, and a stud secured to said plate and projecting through both ends of the belt for the purpose specified.

2. In a device of the character described, a belt having spaced perforations near one end thereof, a buckle secured to said end having a bar upon its rear side, a hook means secured to the other end of said belt and adapted to engage said bar, a stud secured to said belt near said hook means and adapted to project through a perforation in the belt near the buckle.

3. In a device of the character described, a belt, a buckle, said belt having spaced perforations near one end thereof, the inner lap of said belt having a normally disengageable connection with said buckle, said connection comprising cooperating means on said buckle and on the inner lap of the belt for interengaging them, and a second cooperating means carried by the belt which coacts with the perforations to connect the overlapped belt parts at a second point.

RALPH S. FOWLER.